(12) United States Patent
Takahashi et al.

(10) Patent No.: US 7,443,467 B2
(45) Date of Patent: Oct. 28, 2008

(54) LIQUID CRYSTAL DISPLAY DEVICE PROVIDED WITH PIGMENTED LAYERS IN A PIXEL

(75) Inventors: Hideyuki Takahashi, Fukaya (JP); Sakae Yoshida, Himeji (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 377 days.

(21) Appl. No.: 11/286,386

(22) Filed: Nov. 25, 2005

(65) Prior Publication Data

US 2006/0134393 A1    Jun. 22, 2006

(30) Foreign Application Priority Data

Dec. 21, 2004    (JP) .............................. 2004-369865

(51) Int. Cl.
*G02F 1/1335*    (2006.01)
(52) U.S. Cl. ..................... 349/106; 349/109
(58) Field of Classification Search ................ 349/106, 349/109
See application file for complete search history.

(56) References Cited

U.S. PATENT DOCUMENTS

| | | | |
|---|---|---|---|
| 7,009,207 B2 * | 3/2006 | Koo et al. ..................... 257/72 |
| 2004/0217353 A1 * | 11/2004 | Koo et al. ..................... 257/72 |
| 2007/0222882 A1 * | 9/2007 | Kobayashi ................. 348/311 |

FOREIGN PATENT DOCUMENTS

| | | |
|---|---|---|
| JP | 2001-337345 | 12/2001 |
| JP | 2003-222856 A | 8/2003 |
| JP | 2003-255346 A | 9/2003 |
| KR | 2004-0062134 A | 7/2004 |

* cited by examiner

*Primary Examiner*—Mike Qi
(74) *Attorney, Agent, or Firm*—Oblon, Spivak, McClelland, Maier & Neustadt, P.C.

(57) ABSTRACT

For the purpose of preventing line defects from occurring on a display screen in consequence of uneven coating of pigmented layers, a first pigmented layer is formed in a pattern obtained by thinning out a portion in an otherwise complete grid every other pixel in a direction of signal lines and also every other pixel in a direction of scanning lines.

3 Claims, 8 Drawing Sheets

LIQUID CRYSTAL DISPLAY DEVICE PROVIDED WITH PIGMENTED LAYERS IN A PIXEL

CROSS-REFERENCE TO RELATED APPLICATIONS

This application is based upon and claims the benefit of priority from the prior Japanese Patent Application No. 2004-369865 filed on Dec. 21, 2004; the entire contents of which are incorporated herein by reference.

BACKGROUND OF THE INVENTION

1. Field of the Invention

The present invention relates to a liquid crystal display device provided with pigmented layers in a pixel thereof.

2. Description of the Related Art

In recent years, liquid crystal display devices have been widely utilized in various appliances such as a mobile phone and a notebook computer. A liquid crystal display device includes a display unit provided with a pixel in each of intersections determined by a plurality of scanning lines and a plurality of signal lines, and a driver which drives the scanning lines and the signal lines. Each of the pixels further includes a thin-film transistor (TFT), a liquid crystal capacitor, and an auxiliary capacitor. The display unit is formed on an array substrate made of glass. Additionally, in consequence of development of manufacturing process technologies, it has become possible to form a part of the driver on the array substrate, and thus, weight reduction, slimming down, and miniaturization of an entirety of the liquid crystal display have been pursued.

On a display area in a liquid crystal display device, as shown in a plan view in FIG. 1, a first pigmented layer 11, a second pigmented layer 12, and a third pigmented layer 13 are provided. For example, the first pigmented layer 11, the second pigmented layer 12, and the third pigmented layer 13 are pigmented in green, blue, and red, respectively. One pixel is formed of three portions which are of these pigmented layers 11 to 13, respectively. The first pigmented layer 11 is formed in a pattern of vertically aligned stripes alternately repeated, as shown in FIG. 1. Alternatively, as shown in a plan view of FIG. 2, the first pigmented layer 11 is formed in a grid pattern enclosing portions of the second and third pigmented layers 12 and 13.

Nevertheless, in both of the cases where the first pigmented layer 11 is formed in the stripes and where it is formed in the grid pattern, when the array substrate is coated with the second pigmented layer 12, uneven coating attributable to the pattern of the first pigmented layer 11 is more likely to occur with increasing microminiaturization of the array substrate.

Causes of the uneven coating are as follows. In the case where the first pigmented layer 11 is formed in the stripes, when the array substrate is coated with the second pigmented layer 12 by using a spin-coating method (spin-coater method) in a second process following a first process where the first pigmented layer 11 is formed, the color resist of the second pigmented layer flows along borders of the first pigmented layers by receiving centrifugal force, the color resist still having fluidity before its hardening.

In the case where the first pigmented layer 11 is formed in the grid pattern, when the array substrate is coated with the second pigmented layers 12, resistance in a direction of preventing the second pigmented layer 12 from spreading out in a direction of the centrifugal force becomes larger with increasing density of the grid pattern. As a result, for example, uneven coating occurs in a particular direction such as a diagonal direction of the grid pattern.

Accordingly, conventionally, for the purpose of preventing occurrence of uneven coating with the pigmented layers in association with the spin-coating method, the followings have been performed. Specifically, as shown in a plan view in FIG. 3, there has been used a pattern obtained by thinning out a portion from the grid pattern of the first pigmented layer 11 shown in FIG. 2 every other pixel in a vertical direction (a signal line direction), the portion corresponding to the second and third pigmented layers 12 and 13 in a lateral direction (a scanning line direction). On a region where the portion of the first pigmented layer 11 is thus thinned out, each of the second and third pigment layers 12 and 13 is formed in a place which is originally a break for the each.

However, in the pattern in FIG. 3, when a lateral arrangement of the pigmented layers is brought into focus, there are lines of two kinds alternatively arranged. The two kinds are one kind simply including the respective pigmented layers 11 to 13 alternately continuing in a lateral direction, and the other kind including, in addition to a region where the respective pigmented layers 11 to 13 alternately continue in a lateral direction, a region where the first pigmented layer 11 continues in a lateral direction.

In this configuration, among the lines, an area of the first pigmented layer 11 is different every other line, and hence a light reflection ratio is different every other line. As a result, line defects extending in a lateral direction are observed on a display screen, and there arises a problem that they lead to a reduction in display quality.

SUMMARY OF THE INVENTION

An object of the present invention is to prevent line defects on a display screen from occurring as a result of uneven coating of pigmented layers.

A liquid crystal display device according to the present invention includes: a plurality of signal lines and a plurality of scanning lines respectively wired in order that each of the signal lines and each of the scanning lines intersect each other; a first pigmented layer, a second pigmented layer and a third pigmented layer whose portions are respectively arranged in divisions divided by the signal lines and the scanning lines; a pixel formed by combining the portions of the first pigmented layer, the second pigmented layer and the third pigmented layer. The liquid crystal display device is characterized in that the first pigmented layer is formed in a grid-like pattern enclosing portions of the second pigment layer and the third pigment layer, the grid-like pattern is obtained by thinning out a portion from an otherwise complete grid in accordance with a particular cycle relating to the second pigmented layer and third pigmented layer in a direction along scanning lines.

In the present invention, by making the first pigmented layer to be formed in the above pattern, there exists no region where the first pigmented layer continues in a lateral direction along scanning lines. Therefore, it becomes possible to prevent line defects extending in a lateral direction from occurring on a display screen.

DESCRIPTION OF THE EMBODIMENT

First Embodiment

Figure 1:
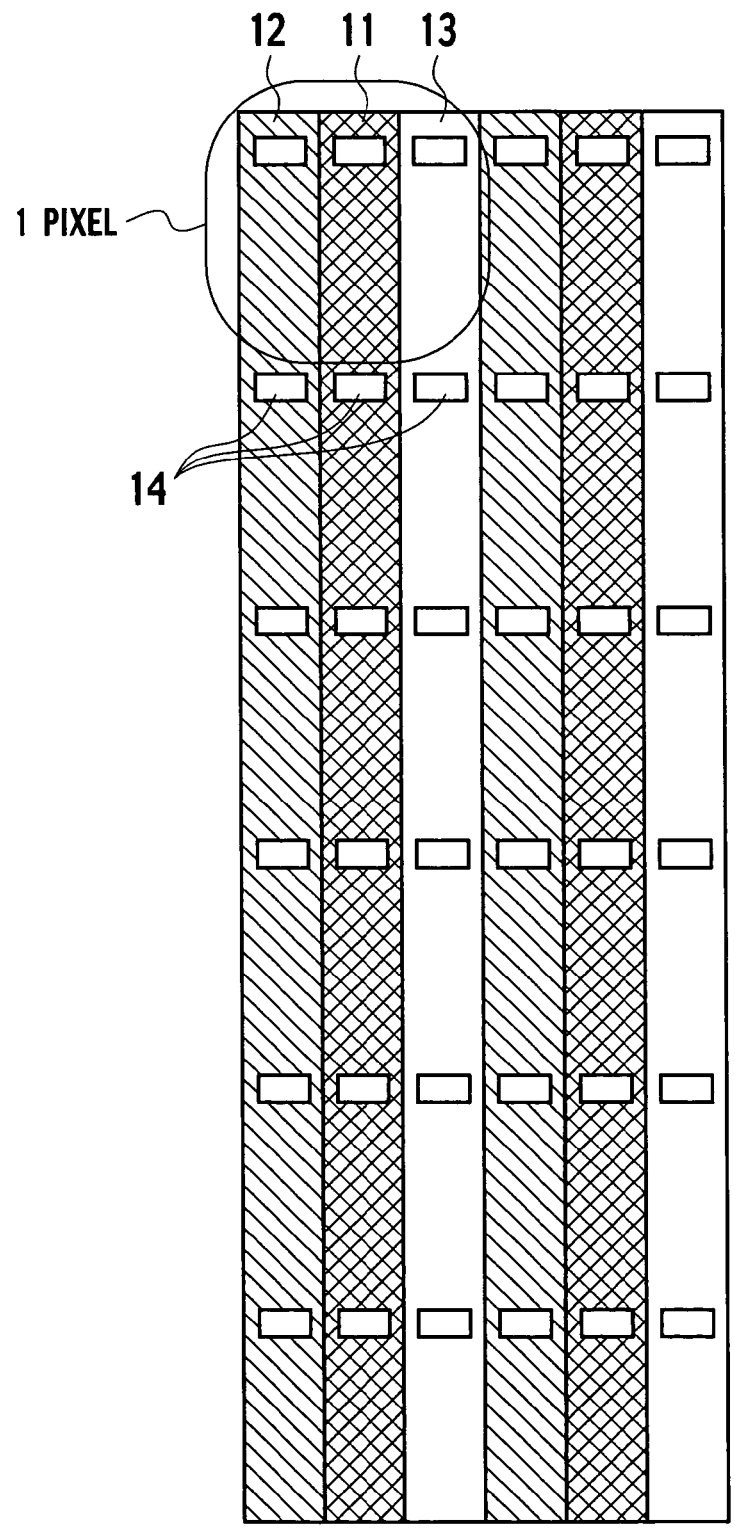
FIG. 1 is a plan view showing an example of arrangement of first to third pigmented layers in conventional liquid crystal display devices.
Figure 2:
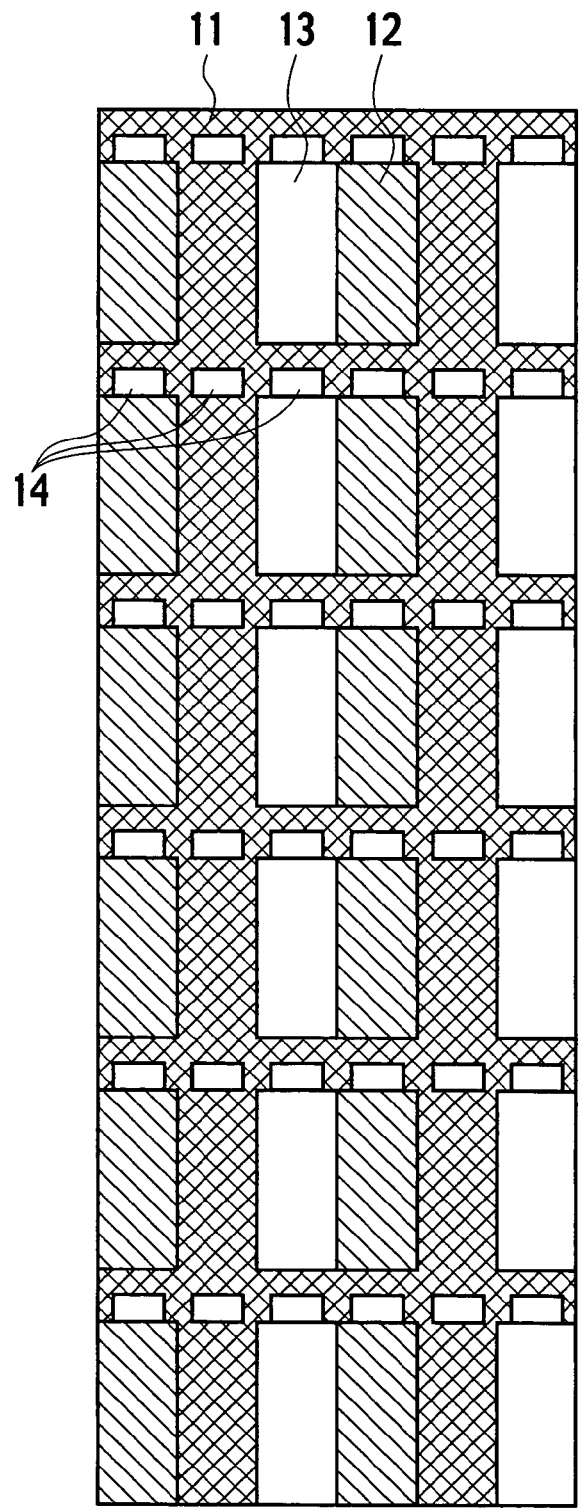
FIG. 2 is a plan view showing another example of arrangement of first to third pigmented layers in conventional liquid crystal display devices.
Figure 3:
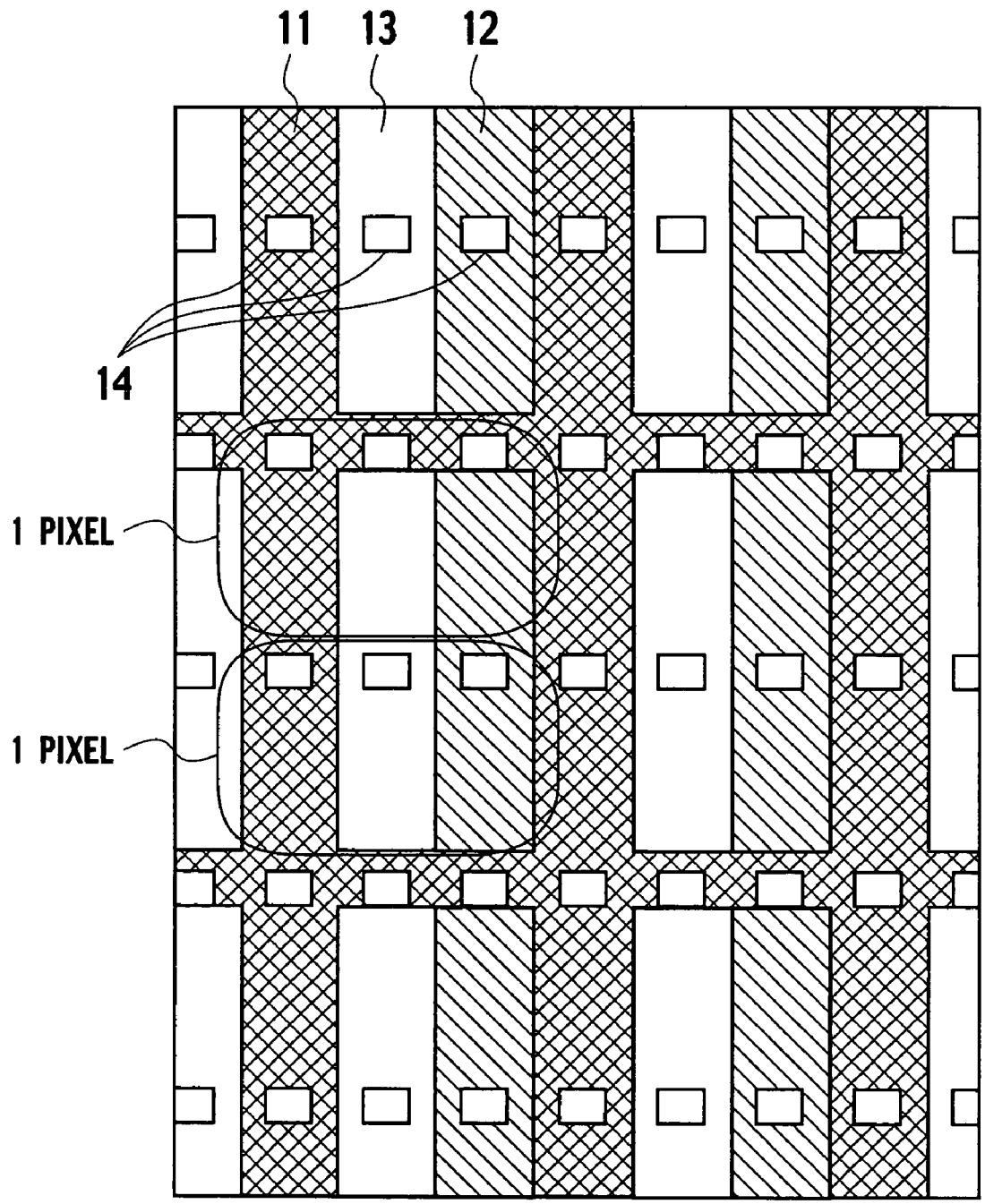
FIG. 3 is a plan view showing still another example of arrangement of first to third pigmented layers in conventional liquid crystal display devices.
Figure 4:
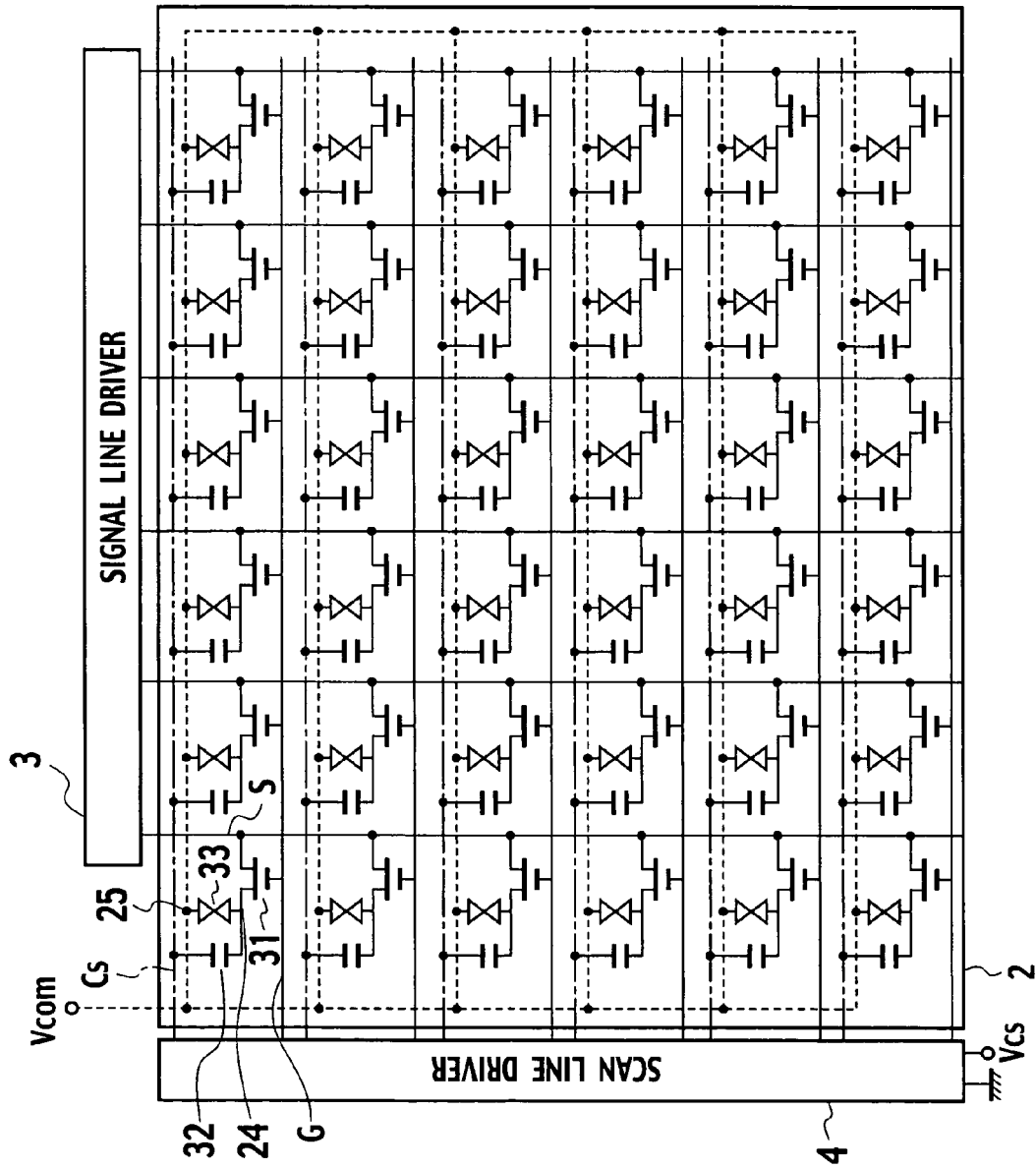
FIG. 4 is a circuit diagram showing a configuration of a liquid crystal display of a first embodiment.

FIG. 4 shows a circuit configuration of a display area in a liquid crystal display device of this embodiment. As shown in that drawing, a plurality of signal lines S and a plurality of scanning lines G are wired in a display area 2 in order that each of the signal lines S and each the scanning lines G can intersect each other. The display area 2 is provided with a switching element 31, an auxiliary capacitor 32, a liquid crystal capacitor 33, and a pixel electrode 24 in each of divisions divided by the signal lines S and the scanning lines G.

The switching element 31 is formed as a MOS thin-film transistor, for example. To a source terminal of the switching element 31, one of the signal lines S is connected. To a gate terminal of the switching element 31, one of the signal lines G is connected. To a drain terminal of the switching element 31, the pixel electrode 24 and the auxiliary capacitor 32 are connected. One terminal of the liquid crystal capacitor 33 is connected to the pixel electrode 24, and the other terminal thereof is connected to a counter electrode 25. With this configuration, a common voltage Vcs is applied to each of the auxiliary capacitors 32, and a common voltage Vcom is applied to each of the counter electrodes 25.

On-off control on the switching element 31 is effected by a scanning pulse supplied thereto through the foregoing scanning line G. When the switching element 31 is on, a video signal voltage supplied thereto through the foregoing signal line S is fed to the pixel electrode 24 and the auxiliary capacitor 32 through the switching element 31. Liquid crystals are driven by applying a video signal voltage to the pixel electrode 24. After the switching element 31 is turned off, the video signal voltage is still stored in the auxiliary capacitor 32, whereby this voltage continues being applied to the pixel electrode 24.

A signal line driver 3 supplies video signals transmitted thereto from the outside, to the signal lines S. A scanning line driver 4 supplies scanning signals to the scanning lines G based on pulse signals transmitted thereto from the outside.

Figure 5:
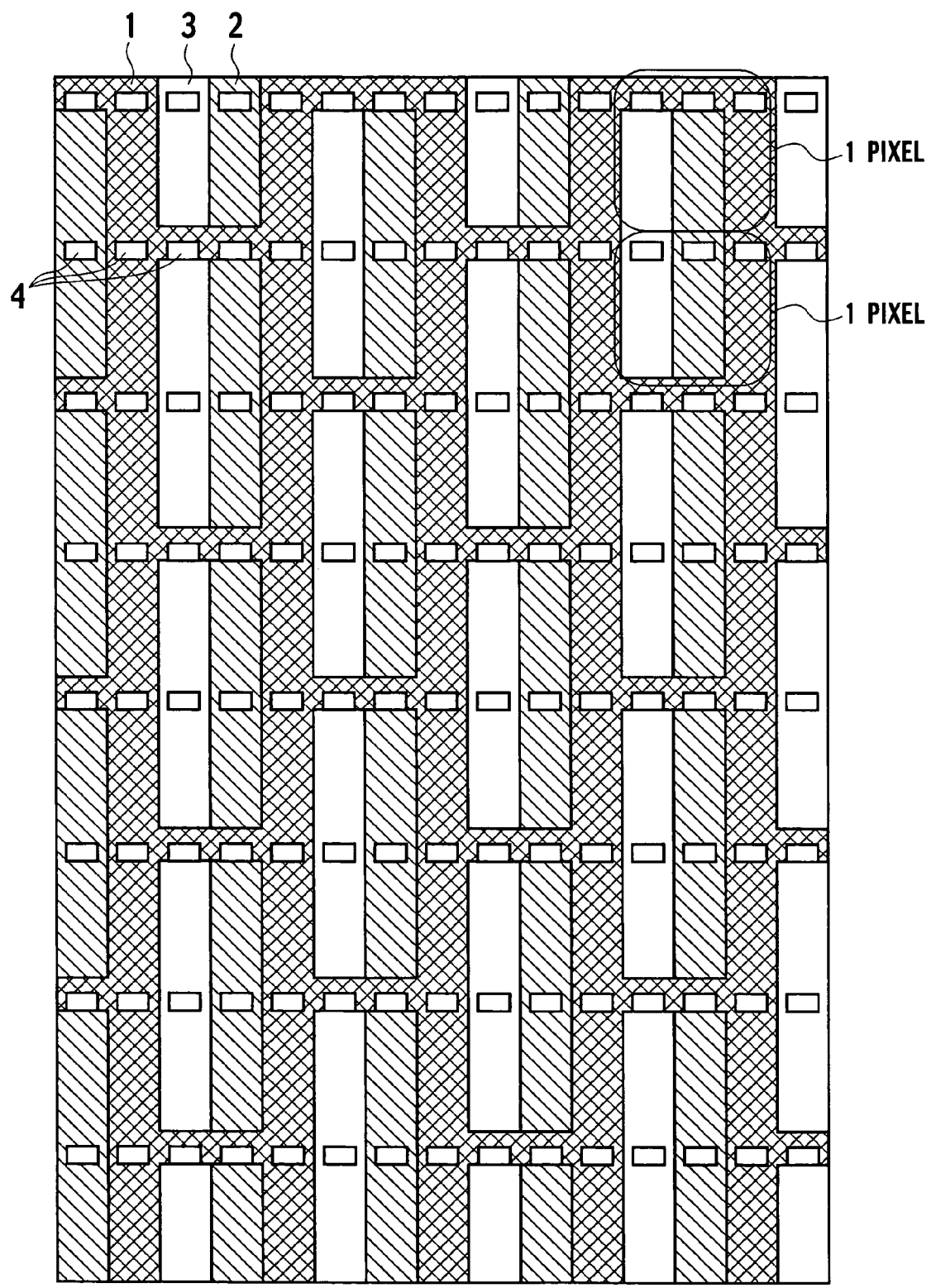
FIG. 5 is a plan view showing an arrangement of first to third pigmented layers in the liquid crystal display device of the first embodiment.

FIG. 5 shows an arrangement of first to third pigmented layers in the display area in this liquid crystal display device. In FIG. 5, a first pigmented layer 1, a second pigmented layer 2, a third pigmented layer 3, and a plurality of contact points 4 electrically connected to the respective thin film transistors are shown. In the display area, one pixel is formed by combining portions of the first pigmented layer 1, the second pigmented layer 2 and the third pigmented layer 3. A display area is formed as an aggregation of the thus formed pixels each being assumed as a minimum unit. The first, second and third pigmented layers 1, 2 and 3 are in different colors which are red, blue and green.

In this liquid crystal display device, the first pigmented layer 1 is formed in a grid-like pattern obtained by thinning out a portion from an otherwise complete grid in accordance with a particular cycle relating to the second and third pigmented layers 2 and 3 in a direction along the scanning lines G, the grid-like pattern enclosing portions of the second and third pigmented layers 2 and 3. Specifically, the first pigmented layer 1 is in a pattern where a portion corresponding to the second and third pigmented layers 2 and 3 in the otherwise complete grid is thinned out every other pixel in a direction along the scanning lines G (a lateral direction). At the same time, the grid-like pattern is a pattern where a portion corresponding to the second and third pigmented layers 2 and 3 in the otherwise complete grid is thinned out every other pixel in a direction along the signal lines S (a vertical direction). In regions corresponding to the thus thinned out portions of the first pigmented layer 1 in the otherwise complete grid, the second and third pigmented layers 2 and 3 are formed.

By using the above pattern, there exists no region where the first pigmented layer 1 continues in plural pixels in a lateral direction. Therefore, line defects extending in a lateral direction cannot occur.

In this liquid crystal display device, an array substrate provided with the display unit 2 and the like and a counter substrate provided with the counter electrode 25 are arranged face-to-face, and a liquid crystal layer is provided in a clearance therebetween. The array substrate, the liquid crystal layer, and the counter substrate are allowed to transmit light from a backlight arranged on the back of the array substrate. A circuit in the display unit 2 is configured to adjust an amount of the thus transmitted light. That is, a light transmission ratio with respect to each of the pigmented layers is controlled in the liquid crystal layer in a manner that a video signal voltage to determine an amount of the transmitted light is applied to the pixel electrode 24 through the switching element 31. Thus, mixing proportions of amounts of light colored by the respective pigmented layers are controlled, whereby it becomes possible to obtain desired color reproduction.

Next, manufacturing processes for this liquid crystal display device will be described. In an initial process, by using publicly known operations, film formation and patterning are preformed on an unillustrated insulating substrate made of glass to form thin-film transistors, a variety of wiring, electrodes, circuits and the like. Through operations of these kinds, a basic structure of an array substrate including 768 pixels vertically and 1024 pixels laterally is prepared. Note that each of the 1024 pixels vertically included therein is intended to include portions of a red layer, a green layer and a blue layer as pigmented layers.

In a subsequent process, a first pigmented layer 1 is formed on the array substrate. As a color of this first pigmented layer 1, any one of three primary colors R, G and B can be selected, and in this embodiment, pigmentation in G (green) will be described as an example.

In order to form the first pigmented layer 1 in green, an entirety of a surface of the array substrate mounted on a spinner (a spin coater) is coated with an ultraviolet curing acrylic resin resist in which green pigment is dispersed, the surface facing a display screen. Then, the array substrate is rotated by the spin coater. Since an ultraviolet curing acrylic resin resist in an uncured state has fluidity, the ultraviolet curing acrylic resin resist dripped on the array substrate is spread over the entire surface thereof in consequence of centrifugal force generated by spins.

Light exposure to the ultraviolet curing acrylic resin resist, with which the entire surface of the array substrate has been coated in consequence of the centrifugal force, is carried out through a photomask which enables an ultraviolet ray to be irradiated only on a part intended to be pigmented in green. This photomask is formed in the same pattern as the pattern of the first pigmented layer 1 shown in FIG. 5, and can transmit an ultraviolet ray. Afterward, the resist is developed by using a developer, and after a baking process, the resist is formed into the first pigmented layer 1 in green, for example, of approximately 3 μm thickness.

In a signal line direction of the display screen (a vertical direction of FIG. 5), a finished pattern of the first pigmented layer 1, which has been formed by the light exposure using this photomask, continues in regions corresponding to the first pigmented layer 1 and has a portion thinned out from an otherwise complete grid every other pixel in regions corresponding to the second and third pigmented layers 2 and 3. On the other hand, in a scanning line direction (a lateral direction of FIG. 5), the finished pattern has a portion thinned out from an otherwise complete grid every other pixel in regions corresponding to the second and third pigmented layers 2 and 3.

In this process, angled portions included in the pattern of the first pigmented layer 1 are regularly arranged on the array substrate. Thereby, uneven coating of the ultraviolet curing acrylic resin resist in consequence of the process using a spin-coating method cannot easily occur or can be dispersed.

In a further subsequent process, as in the case with the process whereby the pattern of the first pigmented layer 1 is formed, the second pigmented layer 2 and the third pigmented layer 3 both having an approximately 3 μm thickness are sequentially formed. In the present invention, the second and third pigmented layer 2 and 3 are pigmented in blue and in red, respectively.

Photomasks used for light exposure forming the second and third pigmented layers 2 and 3 can transmit an ultraviolet ray, and have the same patterns as the respective patterns of the second and third pigmented layers 2 and 3 shown in FIG. 5.

In a finished pattern of the second pigmented layer 2 which has been formed by the light exposure using this photomask, in a signal line direction of the display screen (a vertical direction of FIG. 5), there is a break every other pixel, and the first pigmented layer 1 is disposed in the break. On the other hand, in a scanning line direction of the display screen (a lateral direction of FIG. 5), portions of the first pigmented layer 1, the second pigmented layer 2 and the third pigmented layer 3 are alternately arranged in this sequence. In addition, the same applies to a finished pattern of the third pigmented layer 3.

In a further subsequent process, pixel electrodes are formed by patterning a transparent conductive film formed of Indium Tin Oxide (ITO).

In a further subsequent process, a photosensitive carbonless black resin is applied in a thickness of approximately 6 μm by using a spinner. After this resin is dried and is exposed to light with a photomask, it is developed by a developer. Subsequently, after undergoing a baking process, the array substrate is finished by forming columnar spacers having a film thickness of approximately 5 μm and forming a frame portion.

On the other hand, in a process of preparing the counter substrate, counter electrodes are formed in a manner that, on the insulating substrate made of glass, a transparent conductive film formed of ITO or the like.

In a final process, the liquid crystal display device is finished by arranging the array substrate and the counter substrate face-to face while keeping therebetween a clearance equivalent to a length of the columnar spacers, and additionally by forming a liquid crystal layer in the clearance.

As described hereinabove, in this embodiment, the first pigmented layer 1 is formed in a grid-like pattern by thinning out portions from an otherwise complete grid in accordance with a particular cycle relating to the second and third pigmented layers 2 and 3 in a direction along the scanning lines G, the grid-like pattern enclosing portions of the second and third pigmented layers 2 and 3. According to the above pattern, there exists no region where the first pigmented layer 1 continues in plural pixels in a lateral direction. Therefore, it becomes possible to prevent occurrence of line defects extending in a lateral direction.

Specifically, in this embodiment, the first pigmented layer 1 is formed in the pattern obtained by thinning out a portion from an otherwise complete grid every other pixel in a direction along the scanning lines G (a lateral direction), with respect to the second and third pigmented layers 2 and 3. Thereby, in the scanning line direction, grid portions and stripe portions of the first pigmented layer 1 are alternately arranged, and a number of the grid portions and a number of the stripe portions become equal. Accordingly, light reflection ratios in the respective pixels can be uniformly dispersed in the scanning line direction on the display screen.

Furthermore, in this embodiment, the first pigmented layer 1 is formed in the pattern obtained by thinning out a portion from an otherwise complete grid every other pixel in a direction along the signal lines S (a vertical direction), with respect to the second and third pigmented layers 2 and 3. Thereby, in the signal line direction, the grid portions and the stripe portions of the first pigmented layer 1 are also regularly arranged, and accordingly, light reflection ratios in the respective pixels can be uniformly dispersed in the signal line direction.

Second Embodiment

Figure 6:
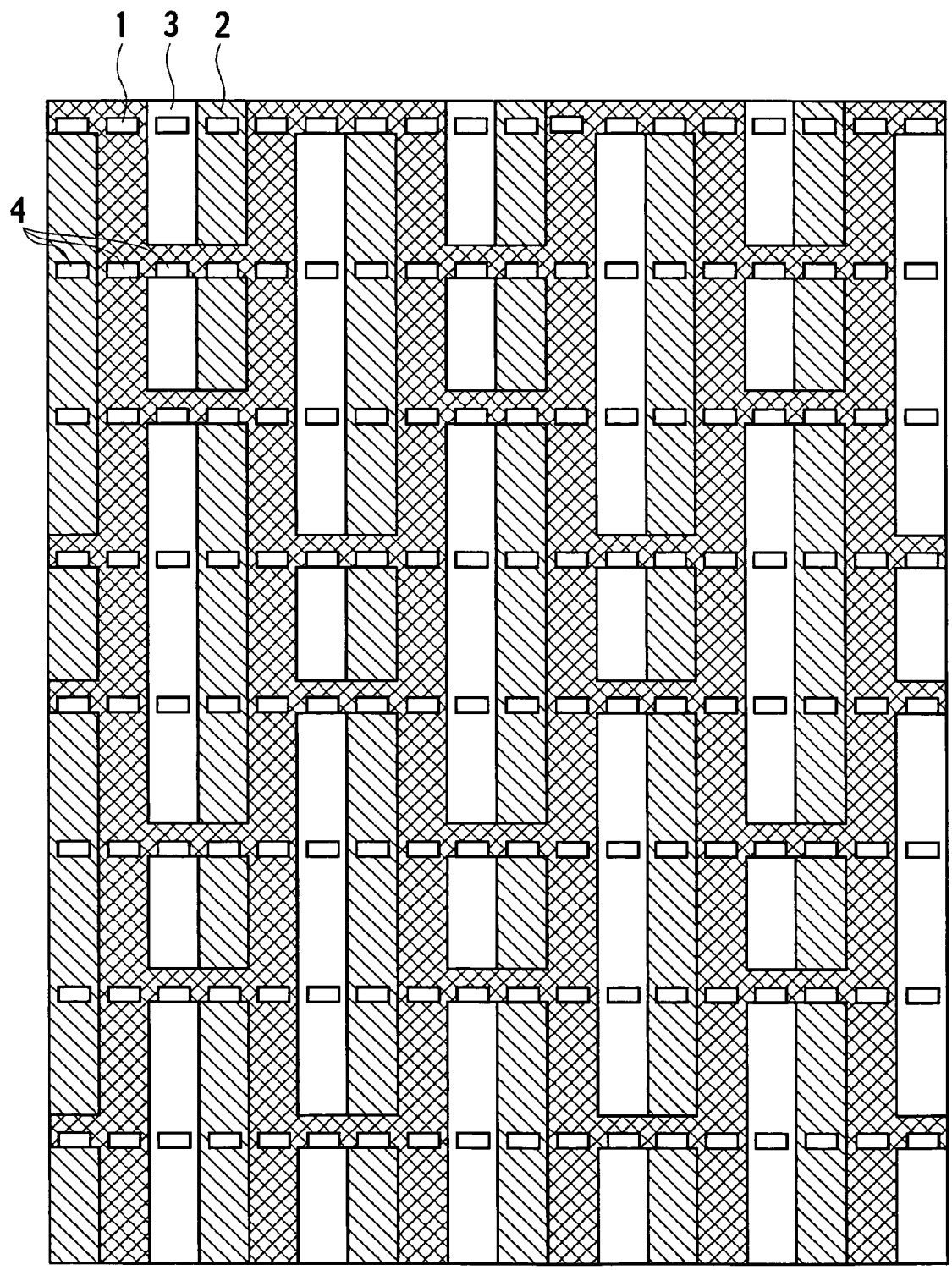
FIG. 6 is a plan view showing an arrangement of first to third pigmented layers in a liquid crystal display device of a second embodiment.

FIG. 6 shows an arrangement of first to third pigmented layers in a display area in a liquid crystal display device of a second embodiment. A basic configuration of this liquid crystal display device is the same as that of the first embodiment, and the only difference between the first and second embodiments is in patterns of the respective pigmented layers. Therefore, a duplicated description will be omitted here, and a description will be given only for the patterns of the respective pigmented layers.

In this liquid crystal display device, the first pigmented layer 1 also continues without breaks in portions corresponding to the first pigmented layer 1 in a signal line direction of a display screen (a vertical direction of FIG. 6). On the other hand, in a scanning line direction of the display screen (a lateral direction of FIG. 6), a portion of the first pigmented layer 1 is thinned out from an otherwise complete grid every other pixel among portions corresponding to the second and third pigmented layers 2 and 3.

In this scanning line direction, a cycle whereby the first pigmented layer 1 is discontinued is constituted of two kinds of cycle. A first kind of cycle is one with "a break followed by a run" appearing sequentially from a left end of FIG. 6 with respect to the first pigmented layer 1 arranged in a certain lateral direction. A second kind of cycle is one with "a run followed by a break" in a manner opposite to the above. In this embodiment, a pattern is repeated in which, after two rows of the first kind of cycle in a lateral direction continue from the top, two rows of the second kind of cycle continue.

According to the thus formed pattern, there exists no region where the first pigmented layer 1 continues in plural pixels in a lateral direction, and therefore, it becomes possible to prevent occurrence of line defects extending in a lateral direction on the display screen.

Furthermore, angled portions included in the pattern of the first pigmented layer 1 are also regularly arranged on the array substrate. Thereby, uneven coating of the ultraviolet curing acrylic resin resist in consequence of the process using a spin-coating method cannot easily occur or can be dispersed.

Next, a mathematical expression of the pattern constituted of the first and second kinds of cycle will be described. The pixels are expressed in (nx, ny) by assuming that the pixels are counted as "ny=0, 1, 2, . . . , n" sequentially from a pixel connected to the endmost scanning line, and that the pixels are counted as "nx=0, 1, 2, . . . , n" sequentially from a pixel connected to the endmost signal line. Among the pixels, a pixel (nx, ny) provided with the first pigmented layer 1 extending in the scanning line direction is set as "1," and a pixel (nx, ny) provided without the first pigmented layer 1 is set as "0." With theses conditions, presence of the first pigmented layer 1 in a portion corresponding to the second and third pigmented layers 2 and 3 is expressed in the following formula:

$$f(nx+ax, ny+ay)=a[(((((nx-bx+3)-(nx-bx+3)\%\ 3)/3)\%2)*2+ny)\%4],$$

where: a[0]=1, a[1]=1, a[2]=0, and a[3]=0; (ax, ay) is any integer which determines an offset; "bx" is a minimum number of lines pigmented by the first pigmented layer 1 among the lines following the signal lines; and "%" means an operation whereby a residue in integer is found.

As described hereinabove, in this embodiment, by forming the first pigmented layer 1 in the grid-like pattern obtained by thinning out portions from an otherwise complete grid in accordance with the particular cycle relating to the second and third pigmented layers 2 and 3 in a direction along the scanning lines G, the grid-like pattern enclosing portions of the second and third pigmented layers 2 and 3, there also exists no region where the first pigmented layer 1 continues in plural pixels in a lateral direction. Thereby, it becomes possible to prevent occurrence of line defects extending in a lateral direction on the display screen.

Third Embodiment

Figure 7:
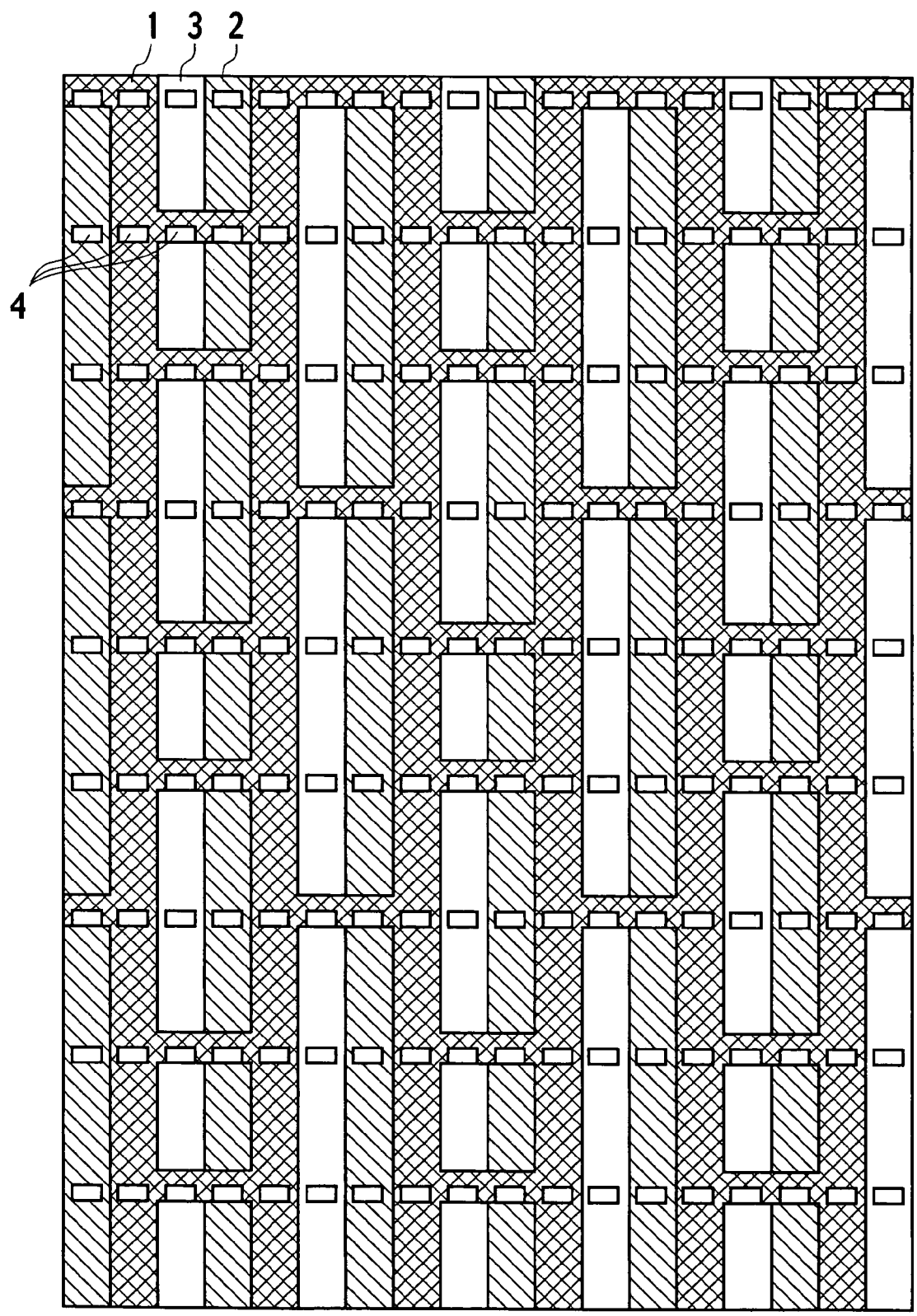
FIG. 7 is a plan view showing an arrangement of first to third pigmented layers in a liquid crystal display device of a third embodiment.

FIG. 7 shows an arrangement of first to third pigmented layers in a display area in a liquid crystal display device of a third embodiment. A basic configuration of this liquid crystal display device is the same as that of the first embodiment, and the only difference between the first and third embodiments is in patterns of the respective pigmented layers. Therefore, a duplicated description will be omitted here, and a description will be given only for the patterns of the respective pigmented layers.

In this liquid crystal display device, the first pigmented layer 1 also continues without breaks in portions corresponding to the first pigmented layer 1 in a signal line direction of a display screen (a vertical direction of FIG. 7). On the other hand, in a scanning line direction of the display screen (a lateral direction of FIG. 7), a portion of the first pigmented layer 1 is thinned out from an otherwise complete grid every other pixel among portions thereof corresponding to the second and third pigmented layers 2 and 3.

In this scanning line direction, a cycle whereby the first pigmented layer 1 is discontinued is constituted of two kinds of cycle. A first kind of cycle is one with "a break followed by a run" appearing sequentially from a left end of FIG. 7 with respect to the first pigmented layer 1 arranged in a certain lateral direction. A second kind of cycle is one with "a run followed by a break" in a manner opposite to the above. In this embodiment, a pattern is repeated in which, after two rows of the first kind of cycle in a lateral direction continue from the top, one row of the second kind of cycle follows.

According to the thus formed pattern, there exists no region where the first pigmented layer 1 continues in plural pixels in a lateral direction, and therefore, it becomes possible to prevent occurrence of line defects extending in a lateral direction.

Furthermore, angled portions included in the pattern of the first pigmented layer 1 are regularly arranged on the array substrate. Thereby, uneven coating of the ultraviolet curing acrylic resin resist in consequence of the process using a spin-coating method cannot easily occur or can be dispersed.

Next, a mathematical expression of the pattern constituted of the first and second kinds of cycle will be described. The pixels are expressed in (nx, ny) by assuming that the pixels are counted as "ny=0, 1, 2, . . . , n" sequentially from a pixel connected to the endmost scanning line, and that the pixels are counted as "nx=0, 1, 2, . . . , n" sequentially from a pixel connected to the endmost signal line. Among the pixels, a pixel (nx, ny) provided with the first pigmented layer 1 extending in the scanning line direction is set as "1," and a pixel (nx, ny) provided without the first pigmented layer 1 is set as "0." With theses conditions, presence of the first pigmented layer 1 in a portion corresponding to the second and third pigmented layers 2 and 3 is expressed in the following formula:

$$f(nx+ax, ny+ay)=c[(((nx-bx+3)-(nx-bx+3)\%3)/3)\%2, ny\ \%3],$$

where: c[0, 0]=1, c[0, 1]=0, c[0, 2]=0, c[1, 0]=0, c[1, 1]=1, and c[1,2]=1; (ax, ay) is any integer which determines an offset; "bx" is a minimum number of lines pigmented by the first pigmented layer 1 among the lines following the signal lines; and "%" means an operation whereby a residue in integer is found.

As described hereinabove, in this embodiment also, by forming the first pigmented layer 1 in the grid-like pattern obtained by thinning out portions from an otherwise complete grid in accordance with the particular cycle relating to the second and third pigmented layers 2 and 3 in a direction along the scanning lines G, the grid-like pattern enclosing portions of the second and third pigmented layers 2 and 3, there exists no region where the first pigmented layer 1 continues in plural pixels in a lateral direction. Thereby, it becomes possible to prevent occurrence of line defects extending in a lateral direction on the display screen.

Fourth Embodiment

Figure 8:
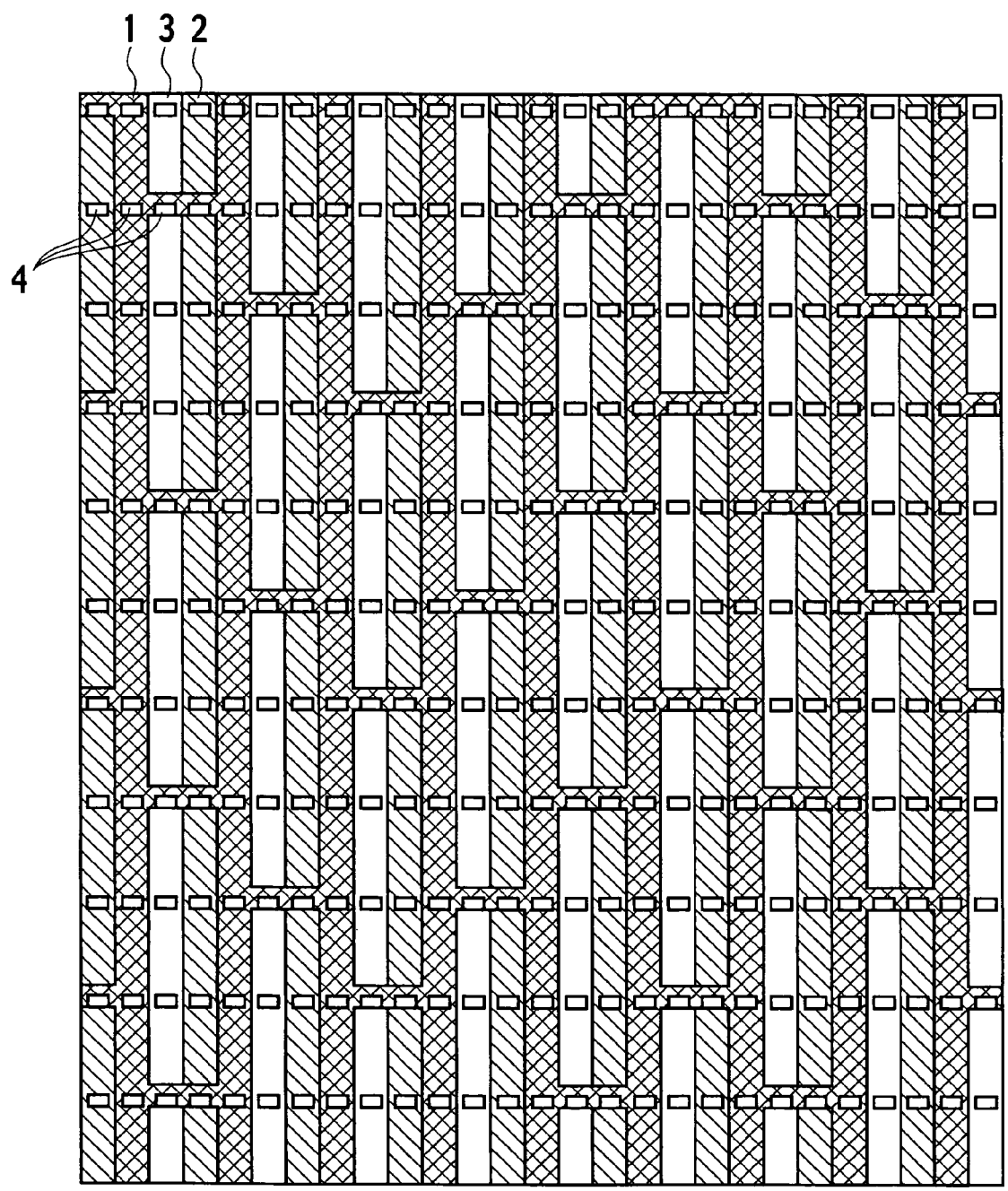
FIG. 8 is a plan view showing an arrangement of first to third pigmented layers in a liquid crystal display device of a fourth embodiment.

FIG. 8 shows an arrangement of first to third pigmented layers in a display area in a liquid crystal display device of a fourth embodiment. A basic configuration of this liquid crystal display device is the same as that of the first embodiment, and the only difference between the first and fourth embodiments is in patterns of the respective pigmented layers. Therefore, a duplicated description will be omitted here, and a description will be given only for the patterns of the respective pigmented layers.

In this liquid crystal display device, the first pigmented layer 1 also continues without breaks in portions corresponding to the first pigmented layer 1 in a signal line direction of a display screen (a vertical direction of FIG. 8). On the other hand, in a scanning line direction of the display screen (a lateral direction of FIG. 8), a portion of the first pigmented layer 1 is thinned out from an otherwise complete grid every predetermined number of pixels among portions corresponding to the second and third pigmented layers 2 and 3.

In this scanning line direction, a cycle whereby the first pigmented layer 1 is discontinued is constituted of cycles of two kinds. A first kind of cycle is one with "a run, a break, a break, a break, a run, and a break" appearing sequentially from a left end of FIG. 8 with respect to the first pigmented layer 1 arranged in a certain lateral direction. A second kind of cycle is one with "a run, a break, and a break" sequentially appearing. Additionally, in this embodiment, in a vertical direction, a pattern is repeated in which one row of the second kind of cycle follows after two rows of the first kind of cycle in a lateral direction continue from the top. Furthermore, adjacent upper and lower rows of the first kind of cycle are arranged to be different by half a cycle.

According to the thus formed pattern, there exists no region where the first pigmented layer 1 continues in plural pixels in a lateral direction, and therefore, it becomes possible to prevent occurrence of line defects extending in a lateral direction on the display screen.

Furthermore, angled portions included in the pattern of the first pigmented layer 1 are regularly arranged on the array substrate. Thereby, uneven coating of the ultraviolet curing acrylic resin resist in consequence of the process using a spin-coating method cannot easily occur or can be dispersed.

Next, a mathematical expression of the pattern constituted of the first and second kinds of cycle will be described. By assuming that the pixels are counted as "ny=0, 1, 2, ..., n" sequentially from a pixel connected to the endmost scanning line, and that the pixels are counted as "nx=0, 1, 2, ..., n" sequentially from a pixel connected to the endmost signal line, the pixels are expressed in (nx, ny). Among the pixels, a pixel (nx, ny) provided with the first pigmented layer 1 extending in the scanning line direction is set as "1," and a pixel (nx, ny) provided without the first pigmented layer 1 is set as "0." With theses conditions, presence of the first pigmented layer 1 in a portion corresponding to the second and third pigmented layers 2 and 3 is expressed in the following formula:

$$f(nx+ax, ny+ay)=a[(b[(((nx-bx+3)-(nx-bx+3)\%3)/3)\%6]+ny)\%3],$$

where: a[0]=1, a[1]=0, a[2]=0, b[0]=0, b[1]=1, b[2]=2, b[3]=3, b[4]=2, and b[5]=1; (ax, ay) is any integer which determines an offset; "bx" is a minimum number of lines pigmented by the first pigmented layer 1 among the lines following the signal lines; and "%" means an operation whereby a residue in integer is found.

As described hereinabove, in this embodiment, by forming the first pigmented layer 1 in the grid-like pattern obtained by thinning out portions from an otherwise complete grid in accordance with the particular cycle relating to the second and third pigmented layers 2 and 3 in a direction along the scanning lines G, the grid-like pattern enclosing portions of the second and third pigmented layers 2 and 3, there also exists no region where the first pigmented layer 1 continues in plural pixels in a lateral direction. Thereby, it becomes possible to prevent occurrence of line defects extending in a lateral direction on the display screen.

What is claimed is:

1. A liquid crystal display device comprising:
   a plurality of signal lines and a plurality of scanning lines respectively wired in order that each of the signal lines and each of the scanning lines can intersect each other;
   a first pigmented layer, a second pigmented layer and a third pigmented layer, portions of all which are arranged in each of division divided by the signal lines and the scanning lines; and
   a pixel formed by combining the portions of the first pigmented layer, the second pigmented layer and the third pigmented layer,
   wherein the first pigmented layer is formed in a grid-like pattern enclosing portions of the second pigment layer and the third pigment layer, the grid-like pattern is obtained by thinning out a portion from an otherwise complete grid in accordance with a specific cycle relating to the second pigmented layer and third pigmented layer in a direction along the scanning lines, and
   wherein, when, among pixels expressed as (nx, ny) by assuming that the pixels are counted as "ny=0, 1, 2, ..., n" sequentially from a pixel connected to the endmost scanning line and that the pixels are counted as "nx=0, 1, 2, ..., n" sequentially from a pixel connected to the endmost signal line, the pixels (nx, ny) provided with and without the first pigmented layer 1 extending in the scanning line direction are set as "1" and "0" respectively, presence of the first pigmented layer 1 in a portion corresponding to the second and third pigmented layers 2 and 3 in each pixel is expressed by the following formula:

$$f(nx+ax, ny+ay)=a[(((((nx-bx+3)-(nx-bx+3)\%3)/3)\%2)*2+ny]\%4],$$

where: a[0]=1, a[1]=1, a[2]=0, and a[3]=0; (ax, ay) is any integer which determines an offset; "bx" is a minimum number of lines pigmented by the first pigmented layer 1 among the lines following the signal lines; and "%" means an operation, whereby a residue in integer is found.

2. A liquid crystal display device comprising:
   a plurality of signal lines and a plurality of scanning lines respectively wired in order that each of the signal lines and each of the scanning lines can intersect each other;
   a first pigmented layer, a second pigmented layer and a third pigmented layer, portions of all which are arranged in each of division divided by the signal lines and the scanning lines; and
   a pixel formed by combining the portions of the first pigmented layer, the second pigmented layer and the third pigmented layer,
   wherein the first pigmented layer is formed in a grid-like pattern enclosing portions of the second pigment layer and the third pigment layer, the grid-like pattern is obtained by thinning out a portion from an otherwise complete grid in accordance with a specific cycle relating to the second pigmented layer and third pigmented layer in a direction along the scanning lines, and
   wherein, when, among pixels expressed as (nx, ny) by assuming that the pixels are counted as "ny=0, 1, 2, ..., n" sequentially from a pixel connected to the endmost scanning line and that the pixels are counted as "nx=0, 1, 2, ..., n" sequentially from a pixel connected to the endmost signal line, the pixels (nx, ny) provided with and without the first pigmented layer 1 extending in the scanning line direction are set as "1" and as "0" respectively, presence of the first pigmented layer 1 in a portion corresponding to the second and third pigmented layers 2 and 3 in each pixel is expressed by the following formula, $$f(nx+ax, ny+ay)=c[(((nx-bx+3)-(nx-bx+3)\%3)/3)\%2, ny\%3],$$

where: $c[0, 0]=1$, $c[0, 1]=0$, $c[0, 2]=0$, $c[1, 0]=0$, $c[1, 1]=1$, and $c[1,2]=1$; (ax, ay) is any integer which determines an offset; "bx" is a minimum number of lines pigmented by the first pigmented layer 1 among the lines following the signal lines; and "%" means an operation whereby a residue in integer is found.

3. A liquid crystal display device composing:
a plurality of signal lines and a plurality of scanning lines respectively wired in order that each of the signal lines and each of the scanning lines can intersect each other;
a first pigmented layer, a second pigmented layer and a third pigmented layer, portions of all which are arranged in each of division divided by the signal lines and the scanning lines; and
a pixel formed by combining the portions of the first pigmented layer, the second pigmented layer and the third pigmented layer,
wherein the first pigmented layer is formed in a grid-like pattern enclosing portions of the second pigment layer and the third pigment layer, the grid-like pattern is obtained by thinning out a portion from an otherwise complete grid in accordance with a specific cycle relating to the second pigmented layer and third pigmented layer in a direction along the scanning lines, and
wherein, when, among pixels expressed as (nx, ny) by assuming that the pixels are counted as "ny=0, 1, 2, . . . , n" sequentially from a pixel connected to the endmost scanning line and that the pixels are counted as "nx=0, 1, 2, . . . , n" sequentially from a pixel connected to the endmost signal line, the pixels (nx, ny) provided with and without the first pigmented layer 1 extending in the scanning line direction are set as "1" and as "0" respectively, presence of the first pigmented layer 1 in a portion corresponding to the second and third pigmented layers 2 and 3 in each pixel is expressed by the following formula, $$f(nx+ax, ny+ay)=a[(b[(((nx-bx+3)-(nx-bx+3)\%3)/3)\%6]+ny)\%3],$$

where: $a[0]=1$, $a[1]=1$, $a[2]=0$, $b[0]=0$, $b[1]=1$, $b[2]=2$, $b[3]=3$, $b[4]=2$, and $b[5]=1$; (ax, ay) is any integer which determines an offset; "bx" is a minimum number of lines pigmented by the first pigmented layer 1 among the lines following the signal lines; and "%" means an operation whereby a residue in integer is found.

* * * * *